Patented Nov. 17, 1931

1,832,211

UNITED STATES PATENT OFFICE

EDWARD T. HOWELL, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

HALOGENATION PRODUCTS OF 4'-AMINO ORTHO BENZOYL BENZOIC ACID AND PROCESS OF MAKING SAME

No Drawing.    Application filed February 23, 1928.    Serial No. 256,486.

This invention relates to halogenation products of 4'-amino ortho benzoyl benzoic acid, such as 3'-halogen- and 3', 5'-dihalogen-4'-amino ortho benzoyl benzoic acid, and to a process of preparing the same.

It is an object of this invention to provide a simple and economically practicable process for preparing halogen substitution products of 4'-amino ortho benzoyl benzoic acid, these products being useful as starting materials in the manufacture of intermediates for the making of dyestuffs.

Other and further important objects of this invention will become apparent from the following description and appended claims.

In the recent U. S. Patent No. 1,654,290, there is disclosed a method for the preparation of 4'-amino ortho benzoyl benzoic acid. I have now found that this body can be halogenated to various halogen derivatives in which the halogen enters in ortho position to the amino group. For example, with the use of chlorine as halogenating agent a chorinated product can be obtained in which the chlorine enters in ortho position to the amino group, thus producing 3'-chloro-4'-amino ortho benzoyl benzoic acid, or, if the product is more exhaustively chlorinated, there is obtained 3', 5'-dichloro-4'-amino ortho benzoyl benzoic acid. Similarly, with the use of bromine, either the 3'-bromo-4'-amino ortho benzoyl benzoic acid or the 3', 5'-dibromo-4'-amino ortho benzoyl benzoic acid can be prepared. The halogenating reaction may likewise be carried out to produce mixed halogen compounds such as 3'-bromo-4'-amino-5'-chloro ortho benzoyl benzoic acid.

The reaction illustrating the halogenating steps is probably best represented by the following chemical equations:

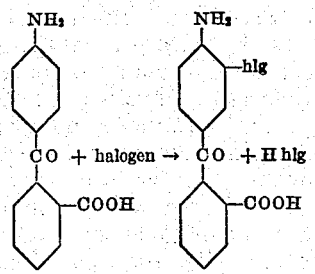

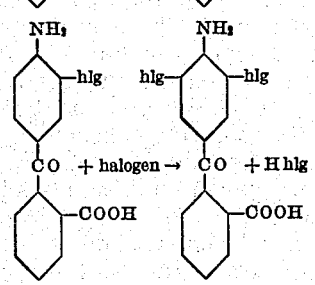

I have found that the halogenation to either ortho position or both ortho positions may be carried out very economically by dissolving the 4'-amino ortho benzoyl benzoic acid in concentrated sulfuric acid of various strengths, either with or without the addition of a catalyst, such as iodine, and adding halogen, either chlorine or bromine.

The halogenation may also be effected to produce ortho halogenated products by treating acidyl derivatives of 4'-amino ortho benzoyl benzoic acid such as the acetyl, toluene sulfonyl, phthalyl and similar derivatives in the usual solvents and adding halogen as such, or in the form of the hypochlorite, to give the corresponding halogenated acidyl derivative, which may then be hydrolyzed to the halogenated amino body. In fact, the usual known methods of halogenating amino or N-substituted amino groups may be employed to produce the halogenated 4'-amino ortho benzoyl benzoic acids, with the halogen atoms entering the positions ortho to the amino group.

Without limiting my method to any particular procedure, the following examples, in which parts by weight are given, illustrate the method in the preferred form.

*Example I.*—To 500 parts of concentrated sulfuric acid, 66° Bé., are added 25 parts of 4'-amino ortho benzoyl benzoic acid. The mass is stirred until complete solution is effected. Chlorine is then slowly passed into the solution at ordinary or room temperature until a test portion removed from the mass shows practically a theoretical amount of chlorine absorbed to correspond to the dichloro derivative. (22.9% of chlorine.) The chlorination mass is then poured into 5000 parts of cold water and stirred until cold. The 3', 5'-dichloro-4'-amino ortho benzoyl benzoic acid separates and is filtered off, washed practically free of acid with cold water and dried.

*Example II.*—The chlorination is run exactly as in Example I except that the reaction is stopped when a test portion indicates that theoretical substitution of chlorine has taken place to produce a mono chlorinated product. This amounts to a value of 12.9% chlorine. The reaction mass is then worked up as in Example I. The product is 3' chloro 4' amino ortho benzoyl benzoic acid.

*Example III.*—To 1000 parts of concentrated sulfuric acid 66° Bé. are slowly added 50 parts of 4'-amino ortho benzoyl benzoic acid. At room temperature there are then added a trace of iodine and about 75 parts of bromine. The solution is heated to 40 to 45° C. and stirred at this temperature until the evolution of hydrobromic acid gas has practically ceased. A test sample worked up should show a bromine content corresponding to about 40%. In case the test portion shows under bromination, more bromine is added to the bromination mass until a test portion indicates that two atoms of bromine have entered the molecule. The bromination mass is then poured into 10,000 parts of cold water and stirred until cold. The 3', 5'-dibromo-4'-amino ortho benzoyl benzoic acid separates, is filtered off and washed practically free of acid with cold water and dried.

*Example IV.*—The procedure is the same as in Example III except the reaction is stopped when sufficient bromine has been added, as shown by the analysis of a test portion, to give a compound containing about 25.0% of bromine. The product obtained is 3'-bromo-4'-amino ortho benzoyl benzoic acid.

The ortho substituted halogen derivatives of 4' amino ortho benzoyl benzoic acid are crystalline solids ranging in color from a light cream to buff. The bromo derivatives are more buff in color, the chloro derivatives more cream. They are quite soluble in dilute alkali solution, from which solution they can be precipitated by the addition of acid. The dihalogen derivatives are quite soluble in alcohol or glacial acetic acid, and in nitro benzene, but sparingly soluble in benzene, toluene and the like. They can be recrystallized in pure form from 65% acetic acid.

The mono halogenated 4'-amino ortho benzoyl benzoic acids can be easily ring closed by heating with concentrated sulfuric acid of various strengths to form a mixture of halogen-amino anthraquinones, probably the 1-halogen-2-amino-anthraquinone and the 2-amino-3-halogen anthraquinones. The 3', 5'-dihalogen-4'-amino ortho benzoyl benzoic acids can likewise be ring closed by heating with concentrated sulfuric acid of various strengths to form the 1, 3-dihalogen-2-amino anthraquinone. That is, the 3', 5'-dibromo-4'-amino ortho benzoyl benzoic acid ring closes to form 1, 3-dibromo-2-amino antharquinone of melting point 239° C. The 3', 5'-dichloro-4'-amino ortho benzoyl benzoic acid ring closes to form 1, 3-dichloro-2-amino anthraquinone of melting point 224° C.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing an ortho substituted halogen derivative of 4'-amino ortho benzoyl benzoic acid, which comprises reacting at moderate temperatures 4'-amino-ortho benzoyl benzoic acid dissolved in concentrated sulfuric acid with a halogen.

2. The process of preparing an ortho substituted chloro derivative of 4'-amino ortho benzoyl benzoic acid, which comprises reacting at moderate temperatures 4'-amino ortho benzoyl benzoic acid dissolved in concentrated sulfuric acid with chlorine.

3. The process of preparing 3', 5'-dichloro-4'-amino ortho benzoyl benzoic acid, which comprises passing chlorine gas into a solution of 4'-amino ortho benzoyl benzoic acid in concentrated sulfuric acid at ordinary temperatures until the theoretical quantity of chlorine has been absorbed, pouring the chlorination mass into cold water and recovering the precipitated 3', 5'-dichloro-4'-amino ortho benzoyl benzoic acid.

4. As a new article of manufacture, an ortho substituted halogen derivative of 4'-amino ortho benzoyl benzoic acid containing up to a maximum of two halogen atoms in ortho position to the amino group.

5. As a new article of manufacture, an ortho substituted chloro derivative of 4'-amino ortho benzoyl benzoic acid containing up to a maximum of two atoms of chlorine in ortho position to the amino group.

6. As a new article of manufacture, 3', 5'-dihalogen 4'-amino ortho benzoyl benzoic acid.

7. As a new article of manufacture, 3', 5'-dichloro-4'-amino ortho benzoyl benzoic acid having most probably the following formula:

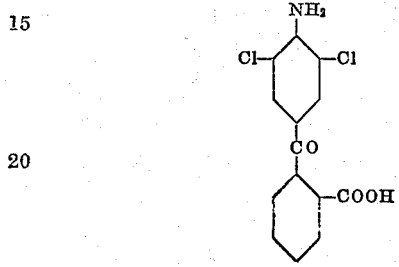

8. The process of preparing 3'-chloro-4'-amino-ortho-benzoyl-benzoic acid, which comprises passing chlorine gas into a solution of 4'-amino-ortho-benzoyl-benzoic acid in concentrated sulfuric acid at ordinary temperatures until the theoretical quantity of chlorine has been absorbed, pouring the chlorination mass into cold water and recovering the precipitated 3'-chloro-4'-amino-ortho-benzoyl-benzoic acid.

9. As a new article of manufacture, 3'-halogen-4'-amino-ortho-benzoyl-benzoic acid.

10. As a new article of manufacture, 3'-chloro-4'-amino-ortho-benzoyl-benzoic acid having most probably the following formula:

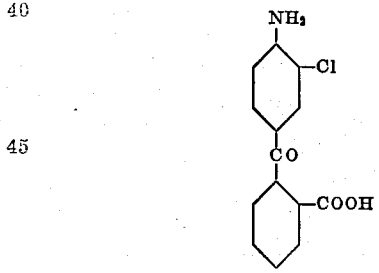

11. The process of preparing 3', 5'-dibromo-4'-amino-ortho-benzoyl-benzoic acid which comprises adding bromine to a solution of 4'-amino-ortho-benzoyl-benzoic acid dissolved in concentrated sulfuric acid at a temperature of 40 to 45° C. until the theoretical quantity of bromine has been absorbed and recovering the 3'-5'-dibromo-4'-amino-ortho-benzoyl-benzoic acid from the reaction mixture.

12. As a new product of manufacture, an ortho-substituted bromo derivative of 4'-amino-ortho-benzoyl-benzoic acid containing up to a maximum of two atoms of bromine in ortho position to the amino group.

13. As a new product of manufacture, 3', 5'-dibromo-4'-amino-ortho-benzoyl - benzoic acid having most probably the following formula:

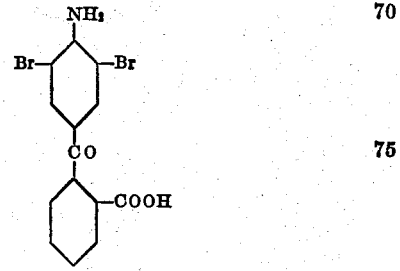

In testimony whereof I have hereunto subscribed my name at Carrollville, Milwaukee County, Wisconsin.

EDWARD T. HOWELL.